Patented July 19, 1932

1,867,666

UNITED STATES PATENT OFFICE

FRIEDRICH AUGUST HENGLEIN AND FRIEDRICH WILHELM STAUF, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING ALKALI-HYPOCHLORITE SOLUTIONS

No Drawing. Application filed February 6, 1929, Serial No. 338,028, and in Germany February 11, 1928.

The present invention relates to a process of preparing alkali-hypochlorite solutions from caustic alkali solutions, containing cellulose or degradation products thereof.

Such alkali solutions which contain cellulose and its degradation products are produced in the cellulose industry and particularly in the artificial silk industry, for example in the manufacture of viscose, or through mercerizing cotton and, quite generally, through all processes where products containing cellulose are treated with caustic alkalies.

In accordance with the present invention the above identified residual alkali lyes containing cellulose and its degradation products in finely divided form are transformed into pure hypochlorite solutions, suitable for further use, by passing chlorine gas slowly into the waste liquors at low temperature, say between the freezing point and about +10° C., while stirring, and if necessary, while cooling. In carrying out our process, care must be taken, that the finally obtained hypochlorite solutions show a weak alkaline reaction. Thus, the hypochlorite is prevented from decomposing. Tests are made and the passing of chlorine through the solution is stopped before all the caustic alkali has been transformed into hypochlorite. Two effects are produced by the new process: The degradation products of cellulose oxidized to carbonic acid and water, the carbonic acid escaping to a large extent and, forming but a small amount of alkali carbonate in reaction with the alkali lye; at the same time the alkali hydroxide forms hypochlorite with the chlorine. An alkali hypochlorite liquor is obtained which can be filtered off from precipitated solid substances, if necessary, and which, then, does not contain any more organic impurities.

The invention is illustrated by the following example, without being limited thereto.

Example

Into a waste soda lye remaining from the manufacture of artificial silk which contains 200 grams of sodium hydroxide and 18 grams of degradation products of cellulose per liter, chlorine is passed at a temperature of about 5° C., until 10 grams of free alkali per liter are present in the dye. A sodium hypochlorite solution is thus obtained containing 150 grams per liter of active chlorine and being free from organic impurities.

The term "cellulose substances" in the specification and in the claims comprises cellulose and degradation products thereof.

We claim:

1. The process which comprises passing into an alkali metal hydroxide waste solution, containing cellulose substances in a finely divided form, chlorine gas at a temperature between the freezing point and about +10° C. until the liquor reacts weakly alkaline.

2. The process which comprises passing into a 20% sodium hydroxide solution containing cellulose substances in a finely divided form chlorine gas at a temperature of about 5° C. until one liter of the solution still contains 10 grams of sodium hydroxide.

In testimony whereof we have hereunto set our hands.

FRIEDRICH AUGUST HENGLEIN. [L. S.]
FRIEDRICH WILHELM STAUF. [L. S.]